(12) United States Patent
Shiraishi et al.

(10) Patent No.: US 9,058,532 B2
(45) Date of Patent: Jun. 16, 2015

(54) IMAGE PICK-UP DEVICE AND POS SYSTEM INCLUDING THE SAME

(71) Applicant: TOSHIBA TEC KABUSHIKI KAISHA, Shinagawa-ku, Tokyo (JP)

(72) Inventors: Takashi Shiraishi, Kanagawa-ken (JP); Shinsuke Yajima, Shizuoka-ken (JP); Hidehiro Naito, Shizuoka-ken (JP); Tomonari Kakino, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/170,690

(22) Filed: Feb. 3, 2014

(65) Prior Publication Data

US 2014/0224874 A1 Aug. 14, 2014

(30) Foreign Application Priority Data

Feb. 12, 2013 (JP) .................................. 2013-024891

(51) Int. Cl.
*G06K 15/00* (2006.01)
*G06K 7/10* (2006.01)
*H04N 5/225* (2006.01)

(52) U.S. Cl.
CPC .......... *G06K 7/10732* (2013.01); *H04N 5/2254* (2013.01); *G06K 7/10831* (2013.01)

(58) Field of Classification Search
CPC .......... G06K 7/10732; G06K 7/10831; H04N 5/2254
USPC ................ 235/383, 454, 459, 462.14, 462.43
See application file for complete search history.

(56) References Cited

U.S. PATENT DOCUMENTS

| 6,039,256 A | 3/2000 | Konosu et al. |
| 8,505,824 B2 * | 8/2013 | Drzymala et al. ....... 235/462.17 |
| 2011/0139875 A1 | 6/2011 | Naito et al. |
| 2012/0126015 A1 * | 5/2012 | Wittenberg et al. ..... 235/462.41 |

FOREIGN PATENT DOCUMENTS

| JP | 11-195082 | 7/1999 |
| JP | 2003-331213 | 11/2003 |
| JP | 2010-020589 | 1/2010 |

OTHER PUBLICATIONS

Office Action of Notice of Rejection for Japanese Patent Application No. 2013-024891 Dated Mar. 31, 2015, 8 pages.

* cited by examiner

*Primary Examiner* — Seung Lee
(74) *Attorney, Agent, or Firm* — Amin, Turocy & Watson, LLP

(57) ABSTRACT

An image pick-up device, which photographs an object to generate an image signal, including: an opening formed to pass light therethrough; a transparent plate which covers the opening; an image detector arranged to generate the image signal; an optical lens forming an image of the object on the image detector through the transparent plate when the object is positioned in an imaging area; a lighting device arranged to illuminate the object and is placed both in an inner area in which the imaging area outside the housing is folded into the housing with reference to the transparent plate, and in an outer area of the imaging area in the housing; and an optical-path modifying element which modifies an optical path of a potential stray light.

14 Claims, 10 Drawing Sheets

IMAGE PICK-UP DEVICE AND POS SYSTEM INCLUDING THE SAME

CROSS-REFERENCE TO RELATED APPLICATION

This application is based upon and claims the benefit of priority from the prior Japanese Patent Application No. 2013-024891 filed on Feb. 12, 2013, the entire contents of which are incorporated herein by reference.

FIELD

Embodiments described herein relate generally to an image device and a POS system including the image device.

BACKGROUND

A conventional image reader electrically communicated with a POS terminal, i.e., Point of Sales terminal, optically captures image of a code symbol on a label attached to a commodity or an object image partly and/or totally showing a commodity through an opening provided to a housing of the image reader. The image reader decodes the captured image to generate code information relating to the code symbol, e.g., a commodity code, or extracts a feature amount from the captured object image. The code symbol image or the object image is captured by an image detector, e.g., CCD sensor (Charge Coupled Device sensor), provided in the image reader.

The opening in the image reader is covered with a transparent flat plate with a permeability, e.g., glass, resin and the like, to prevent foreign matters or dust from being stuck to the image detector.

The image reader includes a lighting device to illuminate an image reading area in which the label with a code symbol or an object is held to capture the image thereof. The image reading area is allocated for the image detector to receive light reflected by the code symbol or the object brought therein. The lighting device includes an LED (Light Emitting Diode). A part of Light, emitted by the lighting device, which is reflected by the transparent plate, becomes a stray light. To prevent the stray light from arriving at the image detector, the lighting device is disposed adjacent to an edge of the transparent plate in the conventional image reader.

DESCRIPTION OF THE DRAWINGS

This and other aspects and advantages of this embodiment will become apparent and more readily appreciated from the following detailed description of the embodiments taken in conjunction with the accompanying drawings wherein.

DETAILED DESCRIPTION

Figure 1:
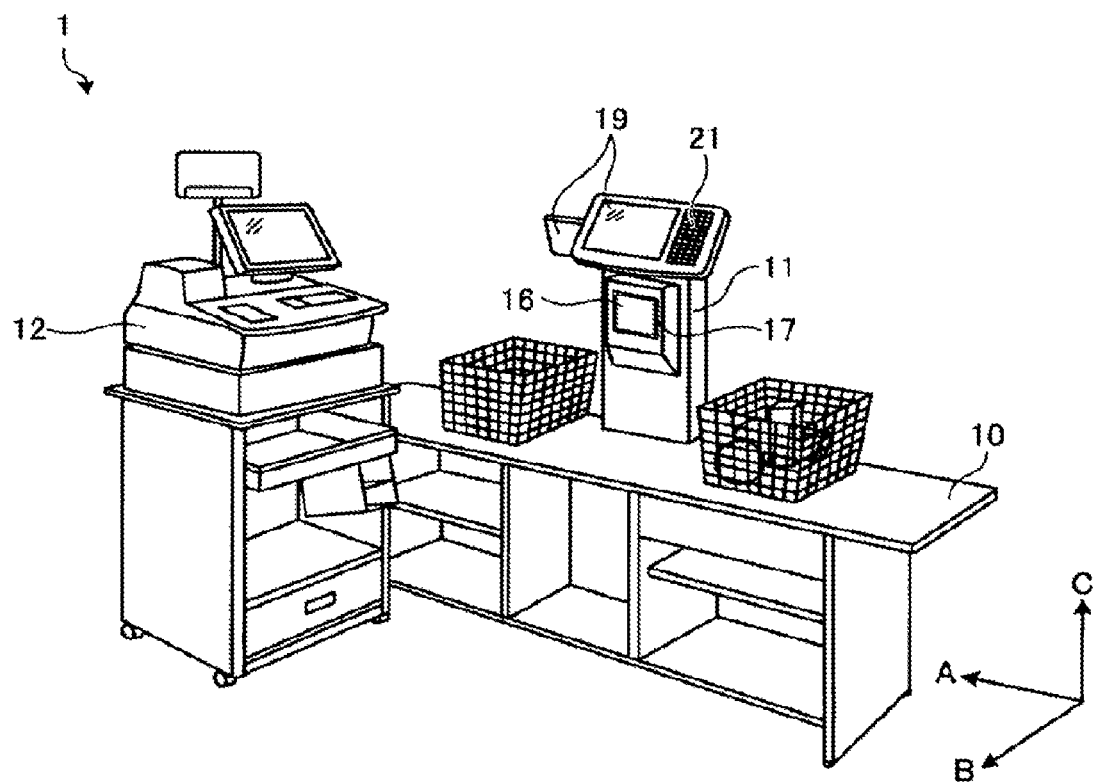
FIG. 1 is a perspective view illustrating an entire POS system including an image reader according to a first embodiment.

According to an embodiment, an image pick-up device, which photographs an object to generate an image signal representing the object, comprises: a housing to which an opening is formed to pass light therethrough; a transparent plate which covers the opening and has a first surface facing to the object and a second surface opposite to the first surface; an image detector arranged in the housing to generate the image signal; an optical lens forming an image of the object on the image detector through the transparent plate when the object is positioned in an imaging area from which light reaches the image detector through the optical lens; a lighting device for emitting light which is arranged in the housing to illuminate the object and is placed both in an inner area in which the imaging area outside the housing is folded into the housing with reference to the first surface, and in an outer area of the imaging area in the housing; and an optical-path modifying element which modifies an optical path of a potential stray light resulting from the light which is emitted by the lighting device and is reflected by at least one of the first and second surfaces.

Embodiments of the present invention will now be described in more detail with reference to the accompanying drawings. However, the same numerals are applied to the similar elements in the drawings, and therefore, the detailed descriptions thereof are not repeated.

(First Embodiment)

FIG. 1 is a perspective view illustrating an entire POS system 1 including an image reading apparatus 11 according to a first embodiment. The arrow A in the FIGURE is referred to a width direction, i.e., right and left direction, in the image reader 11. The arrow B is referred to a back and forth direction in the image reader 11. The arrow C is referred to a perpendicular direction in the image reader 11.

The POS system 1 in FIG.1 includes the image reading apparatus 11 acting as a vertical type image reader and a POS terminal 12 which executes a sales registration proceeding in accordance with an image captured by the image reading apparatus 11. The image reading apparatus 11 is upright-installed in the approximate center of a checkout counter 10 on which a shopping basket is put. The POS terminal 12 is placed at one of the edges of the checkout counter 10. The image reading apparatus 11 and POS terminal 12 are electrically communicated with each other through a well known transmission path not shown in FIG. 1. Combining the image reading apparatus 11 and POS terminal 12 makes a POS terminal section in the POS system 1.

The image reading apparatus 11 includes an image pick-up device 17, key board 21, two displays 19, and so on. The image pick-up device 17 includes an opening 16 covered with a transparent plate facing an operator. The image pick-up device 17 optically photographs a code symbol, e.g., barcode or two-dimensional code, on a label or a part and/or entire of a commodity through the opening 16 to generate an image signal. On the keyboard 21, well known various keys such as ten-keys and keys for a checkout processing are arranged. The keyboard 21 also includes operation keys to register a commodity the registration of which can not be performed. There may be a case that the commodity has no code symbol or the commodity is not properly recognized. The displays 19 for operator and for customer respectively display the name and price of the registered commodity, and so on, to the operator and the customer in accordance with a sales registration processing executed by the POS terminal 12.

Figure 2:
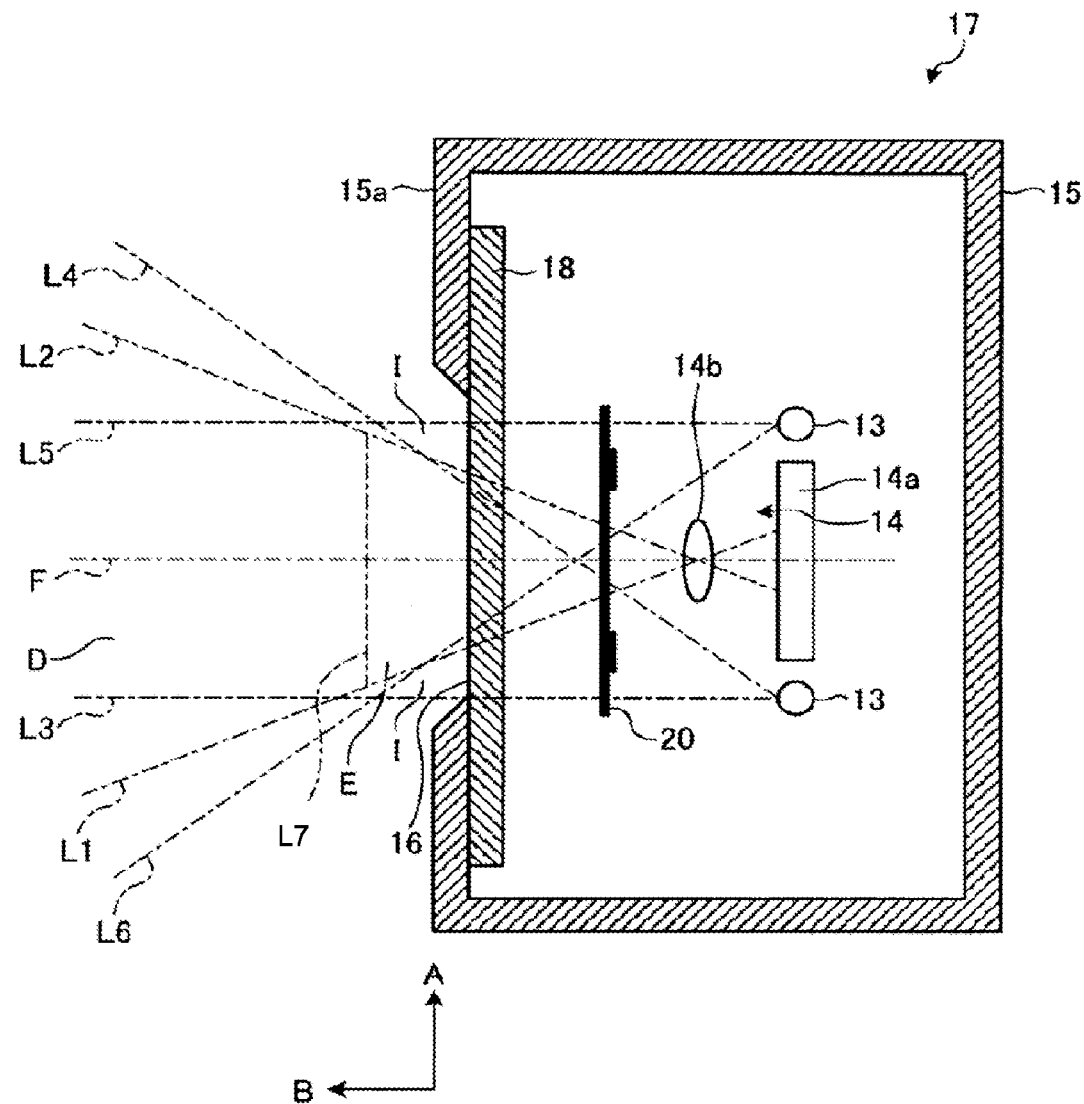
FIG. 2 is a sectional view illustrating an image device contained in the image reader.

The structure of the image pick-up device 17 will now be described in detail. FIG. 2 is a cross-sectional view showing an outline structure of the image pick-up device 17 provided in the image reading apparatus 11.

In FIG. 2, the image pick-up device 17 includes a housing 15 to which an opening 16 is provided to pass light therethrough, and captures an image of the code symbol or the commodity (hereinafter referred to as an "object"). The image pick-up device 17 has an image pick-up section 14 including an image detector 14a, an optical lens 14b, i.e., photographing lens, and a lighting device 13 which irradiates the object with light therefrom. An imaging area D in which an object is held is invisibly formed in front of the opening 16. If the object is held within the imaging area D, for example, the light reflected by the object enters the image pick-up section 14. In the image pick-up section 14, the light passing through the optical lens 14b is received by the image detector 14a and thus the image detector 14a captures image of the object. The imaging area D in FIG. 2 is formed within a range bordered by dashed lines L1 and L2.

The housing 15 is shaped approximately in cubic, e.g., a box-shape. The opening 16 is formed at a front wall 15a of the housing 15. The front wall of the housing 15 faces an operator standing in front of the housing 15. The opening 16 is shaped approximately rectangular in front view. The housing 15 is referred to an enclosure, e.g., the cuboidal case, or a case of the image reading apparatus 11 instead of the enclosure.

The opening 16 is covered with a flat transparent plate 18 to prevent foreign matters or dust from entering the image pick-up section 14. The transparent plate 18 is made of a glass, resin, and so on. The transparent plate 18 is supported by the housing 15. Specifically, the transparent plate 18 is affixed to the housing 15 with an adhesion applied between the perimeter of the opening 16 in the inside of the housing 15 and the transparent plate 18.

The lighting device 13 radiates an illumination light I toward the imaging area D invisibly located in front of the image pick-up section 14 through the transparent plate 18 to illuminate an object taken into the imaging area D. The lighting device 13 includes a plurality of LEDs (Light Emitting Diode) as a light source. A pair of LED groups each including a plurality of LEDs is located apart from the opening 16 and is respectively arranged along with the side edges of the opening 16 in the housing 15, as shown in FIG. 2. In other words, the lighting device 13 includes a pair of left and right LED groups between which the opening 16 is arranged. The pair of LED groups is arranged in bilateral symmetry, i.e., plane symmetry. The lighting device 13 is not limited with the LED group including a plurality of LEDs and may include a single LED.

In FIG. 2, a contour of the illumination light I coming from the lighting device 13 is illustrated by a first combination of dashed lines L3 and L4 and a second combination of dashed lines L5 and L6. An optical-path modifying element 20 functioning as a light shield described later is arranged between the lighting device 13 and the transparent plate 18 to modify a predetermined optical-path of the illumination light I originated from the lighting device 13.

As described above, the image pick-up section 14 includes the optical lens 14b and the image detector 14a. The image detector 14a may be, for example, a CCD image sensor (Charge Coupled device), a CMOS image sensor (Complementary Metal Oxide Semiconductor) and so on. In FIG. 2, an optical axis F of the optical lens 14b in the image pick-up section 14 extends in a right angle to the image pick-up device 17 and passes through the opening 16.

The image pick-up section 14 photographs the object brought in an image reading area E invisibly formed outside the opening 16 of the housing 15. In FIG. 2, the image reading area E is diagrammatically indicated as an area which is defined by dashed line L7 and the outside surface of the transparent plate 18 within the imaging area D.

The image reading area E is described in detail. The image reading area E, i.e., an area in which the image detector 14a of the image pick-up section 14 is capable of photographing the object, is formed according to a characteristic of the optical lens 14b. The optical lens 14b in the present embodiment is formed of a fixed focal lens. An object surface, i.e., the reflected light from the object surface being in right focus on the image detector 14a, of the optical lens 14b is apart from a tip of the lens by a predetermined distance. Placing the object at the object surface enables the image detector 14a to capture an image having highest resolution and sharpness. The nearer or farther the object moves from the object surface with reference to the image detector 14a, the blurrier the image becomes, resulting in lowering the resolution of the image. For example, assuming that a barcode is decoded, the decoder requires measuring respective correct bar-widths constituting a barcode having different color bars, e.g., black and white, based on an image data of the object sensed by the image detector 14a. If the image sensed by the image detector 14a is out of focus, the decoder may not measure the correct barwidth, failing to encode the barcode. Consequently, a part of the imaging area D in which the image detector 14a can capture an image having a higher resolution than a predetermined value forms the image reading area E, in which an image-processing-circuit provided to the decoder (not shown in FIGURES) can extract a code symbol from the image data.

In other words, the image pick-up section 14 is arranged at a position in the housing 15 where the image pick-up section 14 receives a light, reflected from the object brought within the image reading area E in front of the opening 16, which enters the housing 15 through the opening 16. Then, the image pick-up section 14 captures an image of the object by focusing the light on the image detector 14a through the optical lens 14b, and outputs an image data relating to the image captured.

Arrangement of the lighting device 13 is now described in detail.

Figure 3:
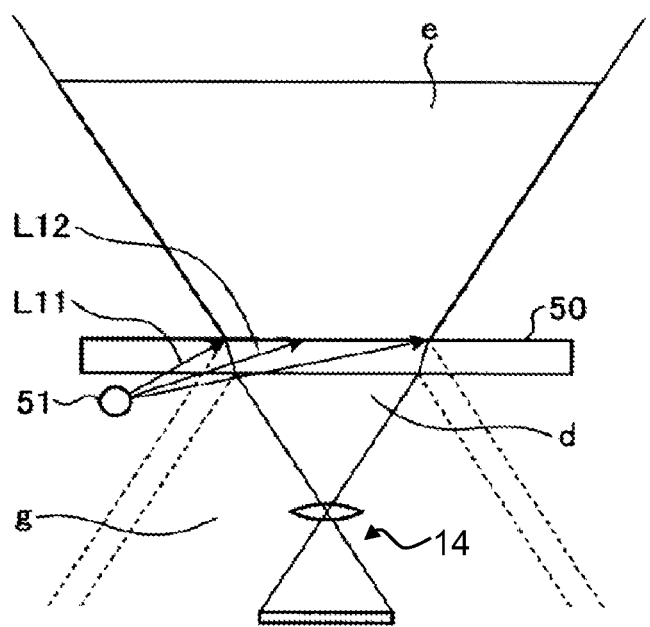
FIG. 3 is a schematic illustration showing a layout of a conventional lighting device.

As shown in FIG. 3, a conventional image pick-up device includes a lighting device 51 placed in close proximity to an edge of a transparent plate 50 to prevent a stray light from reaching an image detector, because a part of light emitted from the lighting device 13 is reflected by the transparent plate 50 covering an opening, resulting in generation of the stray light. Referring to FIG. 3, the arrangement of the transparent plate 50 which prevents foreign matters from entering the image pick-up device, the image pick-up section 14, and the lighting device 51 is described. To prevent the stray light in the conventional image pick-up device, the lighting device 51 is arranged in proximity to the transparent plate 50 and at the outside of an area g (hereinafter referred to as "equivalent imaging area g") which is wider than one of a first area and a second area. The first area is defined by optical paths which are directed by folding an image area d of the image pick-up section 14 with reference to an light emitting surface of the transparent plate 50, functioning to reflect light from the lighting device 51. The second area is defined by optical paths which are directed by folding an image area d of the image pick-up section 14 with reference to an light incident surface of the transparent plate 50, functioning to reflect light from the lighting device 51. To simplify the description, the lighting device 51 illustrated in FIG. 3 is disposed at only one side of the transparent plate 50.

As shown in FIG. 3, the conventional image pick-up device having the lighting device 51 which is positioned both outside the equivalent imaging area g and in close proximity to the transparent plate 50 includes optical path lengths L11 and L12 significantly different from one the other. The optical path length L11 extends from the lighting device 51 to a tip of the light emitting surface of the transparent plate 50 (nearby the lighting device 51) in the equivalent imaging area g. Another optical path length L12 extends from the lighting device 51 to an approximate center of the light emitting surface of the transparent plate 50 in the equivalent imaging area g, becoming longer than the optical path length L11. Intensity of illumination is physically reverse-proportional to a square of the path length. Therefore, this arrangement of the lighting device 51 poses one problem that the intensity of illumination near the transparent plate 50 is too high in a perimeter portion of the imaging area d near the lighting device 51. Contrary to the above, the intensity of the illumination in an approximate center portion of the imaging area e near the transparent plate 50 is too low, even if light rays emitted from a plurality of LEDs are added.

Figure 4:
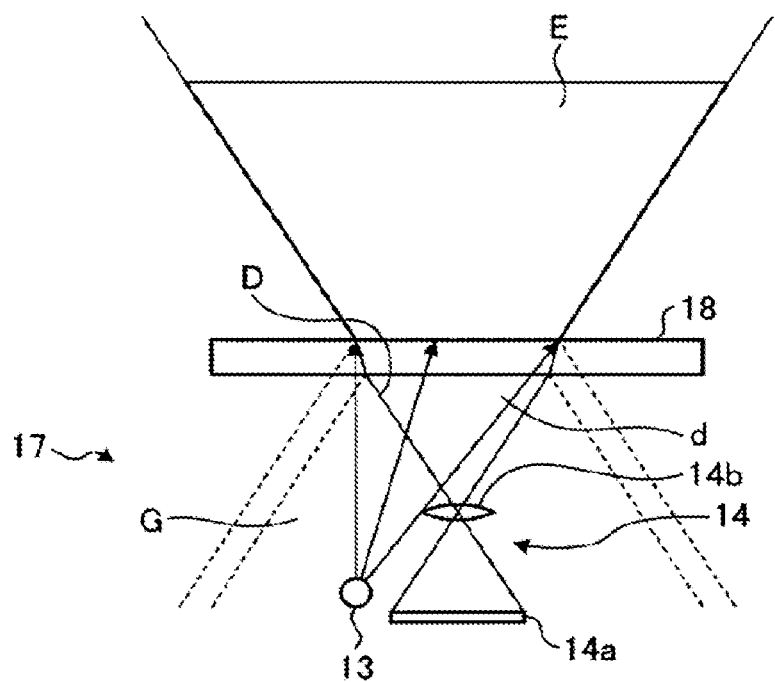
FIG. 4 is a schematic illustration showing a layout of a lighting device in the first embodiment.

FIG. 4 is a schematic diagram illustrating arrangement of the lighting device 13 according to the present embodiment. To simply describe the structure, the lighting device 13 is arranged at only one of the opposite sides of the image detector 14a. The lighting device 13 included in the image pick-up device 17 is placed both in an inner area of the equivalent imaging area G and in an outer area of the imaging area D to uniformly illuminate a target object carried into proximity to the transparent plate 18. Besides, the lighting device 13 is disposed in such a manner that a distance between the position of the lighting device 13 and an approximate perimeter portion of the imaging area D on the transparent plate 18 is nearly the same as that between the position of the lighting device 13 and an approximate center portion of the equivalent imaging area G on the plate 18.

In other words, the lighting device 13 is arranged in the housing 15 of the image pick-up device 17 to illuminate the target object. The imaging area D outside the housing 15 is folded into the housing 15 with reference to a first surface of the transparent plate 18 facing the target object, resulting in a first inner area. The imaging area D outside the housing 15 is folded into the housing 15 with reference to a second surface of the transparent plate 18 opposite to the first surface, resulting in a second inner area. The lighting device 13 is placed both in a wider one of the first and second inner areas and in an outer area of the imaging area D residing in the housing 15. If the transparent plate 15 is made of a flat glass, the lighting device 13 is placed both in the first inner areas and in the outer area of the imaging area D.

Assuming that the number of light sources, i.e., portion of emitting light from the lighting device 13, is designated n (n is an integer more than one). If n of LEDs are arranged according to the light quantity distribution abovementioned, the intensity of illumination in the center portion of the imaging area D is n times as much as one in the outer portion of the area D. Therefore, this arrangement of the LEDs is more effective to realize more intensity of illumination in the center portion of the imaging area D.

If the uniform intensity of illumination is required in the entire reading area E set forth above, the following arrangement of the lighting devices 13 is preferable. The intensity of illumination irradiated by the lighting device 13 is reverse-proportional to a square of the path length from the lighting device 13. Assuming that a first optical path length Lo extending from the lighting device to an outer portion of the imaging area D on the transparent plate 18 and a second optical path length Lc extending from the lighting device to an approximate center portion of the opening 16 on the transparent plate 18 are defined, a ratio of illumination intensity between the outer portion and the center portion is formulated below.

$$1/(Lo)^2 : 1/(Lc)^2$$

Assuming that lights emitted from the n of the lighting devices are added in the center portion and light emitted from one of the n of the lighting devices is affected few by the other lighting devices at an outer portion, the image pick-up device 17 having n of the lighting devices which illuminate superimposing lights therefrom requires to satisfy the following equation to obtain the uniform intensity of illumination in the entire reading area E.

$$(Lc)^2/(n \times (Lo)^2) = 1$$

The above equation is simplified, resulting in the following relationship between illumination intensities of the outer and center portions.

$$Lc/Lo = \sqrt{n}$$

In an actual design, the arrangement of the lighting devices 13 is desirable to satisfy the following inequality, considering the abovementioned cases.

$$1 \leq Lc/Lo \leq \sqrt{n}$$

Two or four LEDs serving as the lighting devices 13 are effective to illuminate the target object. The LEDs placed both in an inner area in which the imaging area is folded into the housing with reference to the surface facing the target object and in an outer area of the imaging area are desirable to be arranged on a concentric circle centering the CCD, viewing from B axis, as an image detector 14a, or to be arranged interposing the CCD between the LEDs.

Figure 5:
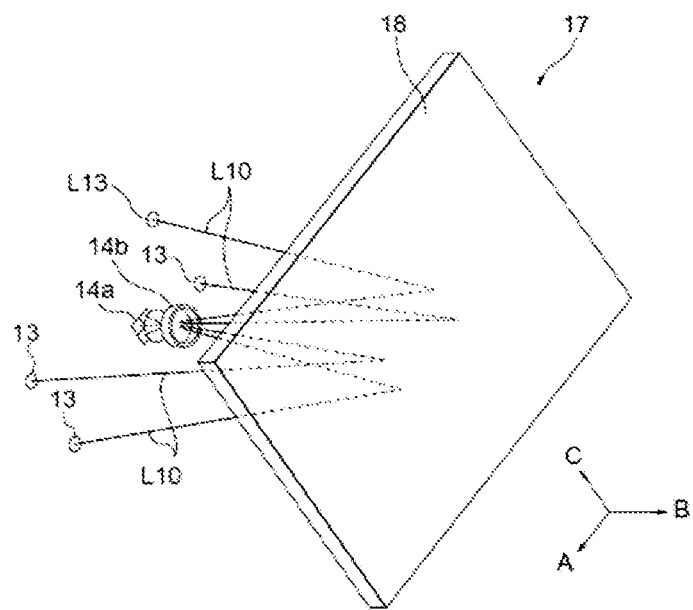
FIG. 5 is a schematic illustration showing an example of a stray light.

As shown in FIG. 4, the arrangement of the lighting devices 13 placed in the equivalent imaging area G generates a potential stray light, reflected by the transparent plate 18, which arrives at the image detector 14a through an entrance pupil of the optical lens 14b provided in the image pick-up section 14. FIG. 5 is a schematic diagram showing an optical path of a stray light. In the FIGURE, the stray light is indicated by ray L10, which is a part of light emitted from the lighting device 13. The ray L10 is reflected by an incident surface or exit surface of the transparent plate 18, and arrives at the image detector 14a through an entrance pupil of the optical lens 14b. The stray lights originated from the lighting devices 13 are added to a normal light reflected by a commodity (target object), and is incident on the image detector 14a. The stray lights adversely affect reading performance of the image pick-up section 14.

To prevent the potential stray light L10, the image pick-up device 17 mounted on the image reading apparatus 11 in this embodiment includes a light shield 20 functioning as an optical-path modifying element which modifies and/or shields the potential stray light L10. The light shield 20 is positioned on a light path of the ray L10 acting as the potential stray light.

Figure 6:
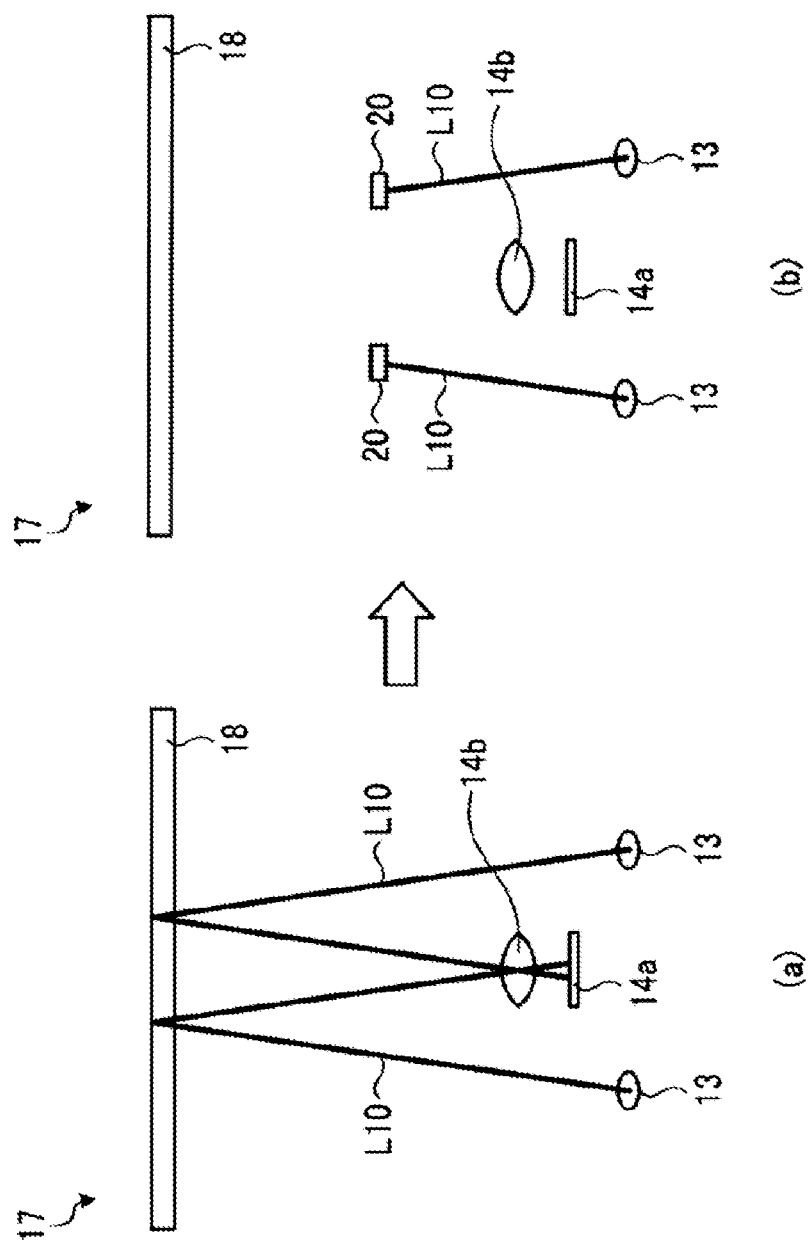
FIG. 6 is a schematic illustration showing a layout of a light shield placed on a light path through which ray of a potential stray light passes.

FIG. 6 is a schematic diagram illustrating an arrangement of the image pick-up section 14. FIG. 6(a) shows a schematic diagram of an image pick-up section which does not have a light shield. FIG. 6(b) shows the image pick-up section which has the light shield 20 disposed on the optical path of the potential stray light L10. The light shield 20 is provided to shield the potential stray light L10 arriving at the image detector 14a through an entrance pupil of the optical lens 14b provided in the image pick-up section 14.

As shown in FIG. 6(b), the light shield 20 arranged on the light path L10 eliminates part of the light path starting from the light shield 20 and reaching the image detector 14a, and thus the potential stray light cannot reach the image detector 14a.

Figure 7:
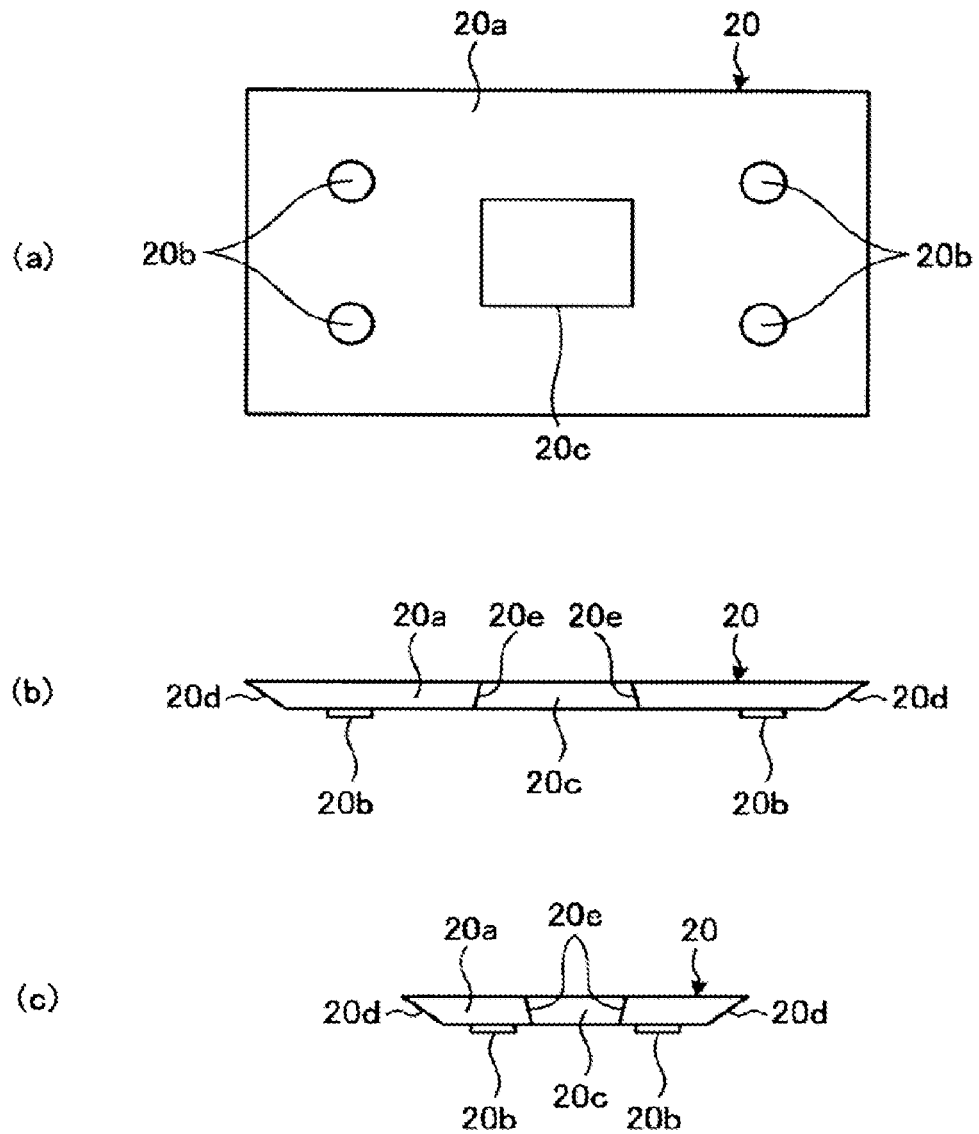
FIG. 7 is an illustration of an example of the light shield: (a) plan view, (b) lateral cross section, and (c) longitudinal cross section.

FIG. 7 including (a): a plan view, (b): a lateral cross sectional view, and (c): a longitudinal cross sectional view, shows an example of the light shield 20. The light shield 20 is substantially formed of a flat transparent plate 20a, e.g., glass, resin, and so on. The light shield 20 includes a shield pattern 20b formed on the flat transparent plate 20a. The shield pattern 20b is printed by screen printing, utilizing an opaque ink having a high opacity, e.g., black paint. A position at which the shield pattern is formed is designed based on an analytical result of light path through which the potential stray light passes, taking both a first position at which the light shield 20 is placed and a second position where the lighting device 13 is placed into consideration. To narrow a region which is shielded by the light shield 20 in the image reading region E as much as possible, the light shield 20 is preferable to dispose in closer proximity to the transparent plate 18.

The light shield 20 having a rectangular shape is composed of a light transmissive plate 20a, the shield pattern 20b, and an aperture 20c. The light transmissive plate 20a, e.g., glass, resin, and so on, includes the aperture 20c at a position corresponding to the imaging area D of the image pick-up section 14. Inner edge of the aperture 20c is rounded in shape to prevent a scattered light from being occurred because of inner steep edge of the aperture 20c. The light transmissive plate 20a also includes a first surface, a second surface opposite to the first surface, a perimeter surface 20d, and an inner surface of the aperture 20e. The shield pattern 20b is formed on the second surface facing the lighting device 13. The perimeter surface 20d and inner surface of the aperture 20e are processed in slant with reference to the second surface such that the perimeter and inner surfaces 20d, 20e are in parallel with the ray emitted from the closest lighting device 13. This slant surface prevents the ray from changing direction due to surfaces of the aperture edge and perimeter of the transmissive plate 20a.

Therefore, the image reading apparatus 11 in the first embodiment can realize a uniform distribution of illumination both in the image reading area E and in the proximity to the transparent plate 18, while the stray light is removed.

Figure 8:
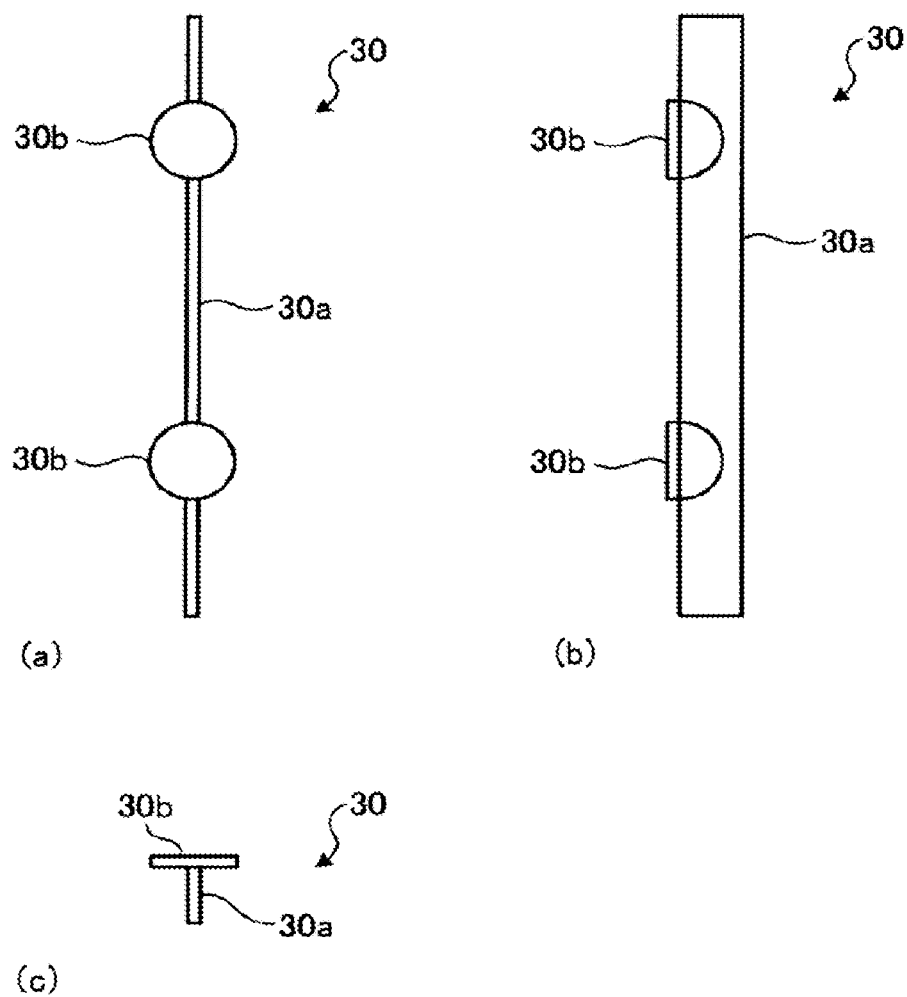
FIG. 8 is an illustration of an example of another light shield: (a) plan view, (b) side view, and (c) front view.

The light shield 20 having the shield pattern 20b serving as the optical-path modifying element which prevents ray L10 from potentially becoming the stray light, is applied to the image pick-up section in the first embodiment. The optical-path modifying element is not limited to the light shield 20. Instead of the light shield 20, another light shield 30 depicted in FIG. 8 can be utilized as an optical-path modifying element. The light shield 30 exemplified in FIG. 8 is illustrated in (a): a plan view, (b): a side view, and (c): a front view. The light shield 30 is formed of a metal plate. Two shield plates 30b (shield patterns 30b) each shaped in circle are mounted on a substrate 30a shaped in flat. The substrate 30a is set in parallel with a direction of ray L10 which may become the potential stray light. The shield plates 30b are respectively coated with anti-reflection material to prevent light from being reflected by the shield plate 30b.

Alternatively, an optical element, e.g., a lens, having a shield pattern, can be provided to illuminate a target object through the optical lens. The optical lens is utilized to suppress an angle at which light emitted from an LED serving as the lighting device 13 diverges to illuminate the object. To suppress the angle, the shield pattern made of an opaque ink can be printed on the lens by screen printing. As set forth above, a position at which the shield pattern is formed is designed based on an analytical result of light path through which the potential stray light passes, taking both a first position where the optical lens is placed and a second position where the lighting device 13 is placed into consideration.

(Second Embodiment)

The second embodiment will now be described. An image pick-up device 17 in the second embodiment includes an optical-path modifying element 40 which modifies or deflects a potential stray light L10. The optical-path modifying element 40 included in the second embodiment is different from the light shield 20, 30 included in the image reading apparatus 11 of the first embodiment.

Figure 9:
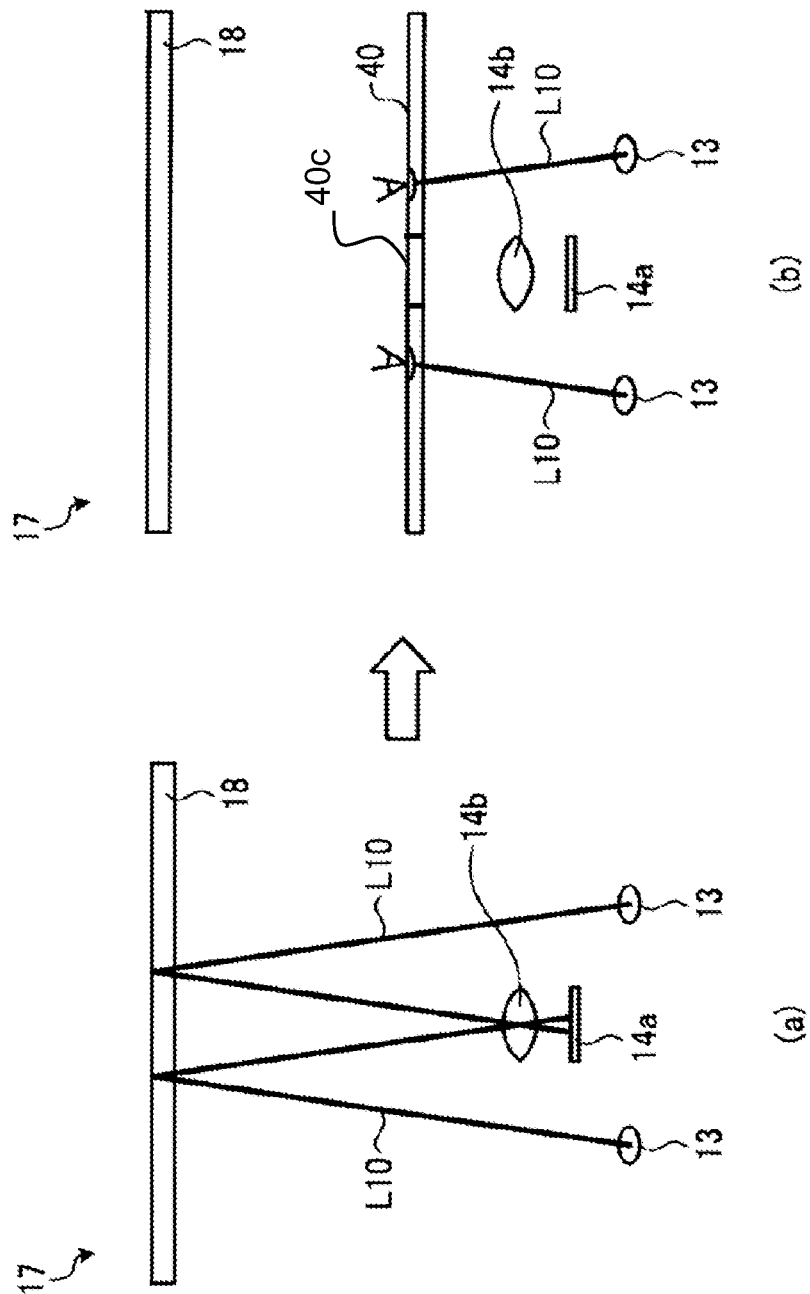
FIG. 9 is a schematic illustration showing a layout of an optical path modifying element according to a second embodiment.

FIG. 9 is a schematic diagram showing an arrangement of the optical-path modifying element 40 in the second embodiment. In FIG. 9(a), the image pick-up device 17 does not have an optical-path modifying element 40.

In FIG. 9(b), the image pick-up device 17 has an optical-path modifying element 40 disposed on an optical path of a light ray of potential stray light L10 to modify or deflect the optical-path of light ray L10. The optical-path modifying element 40 does not allow a potential stray light to reach the image detector 14a through an entrance pupil of the optical lens 14b placed in the image pick-up section 14.

As shown in FIG. 9(b), the optical-path modifying element 40 placed onto the optical-path of the light ray L10 causes a direction of the light ray L10 to be changed, wherein the light ray L10 emitted from the lighting device 13 enters the image pick-up section 14 bordered by the optical-path modifying element 40. Thus, the potential stray light reaching the image detector 14a is eliminated.

Figure 10:
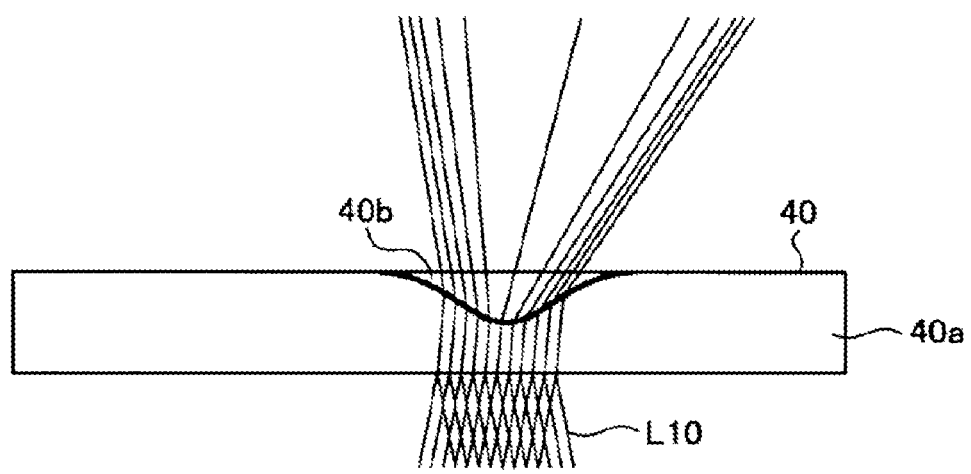
FIG. 10 is an enlarged view of a part of the optical path modifying element according to the second embodiment.

FIG. 10 is a schematic illustration showing a structure of the optical-path modifying element 40 partially enlarged. The optical-path modifying element 40 is substantially formed of a light transmissive flat plate 40a, e.g., glass, resin, and so on. The light transmissive plate 40a is, for example, a transparent plate. The optical-path modifying element 40 includes an optical-path modifying portion 40b in the light transmissive plate 40a. The optical-path modifying portion 40b causes the light ray L10 to change the optical-path thereof in terms of at least one of angle and position. Incidentally, a position at which the optical-path modifying portion 40b is placed is designed based on an analytical result of light path through which the potential stray light passes, taking both a first position where the optical-path modifying element 40 is placed to change the optical path of a potential stray light and a second position where the lighting device 13 is placed into consideration. The light transmissive plate 40a acting as the optical-path modifying element 40 has an aperture 40c. The aperture 40c is formed at a position corresponding to the imaging area D of the image pick-up section 14, likewise the transparent plate 20a of the light shield 20.

As shown in FIG. 10, the optical-path modifying portion 40b formed on the light transmissive plate 40a has a concave in cross-sectional shape, such as an approximate conical shape. An inside area in the concave is filled with air. In more detail, the cross-section of the optical-path modifying portion 40b is shaped to be a hyperbolic curve. An apex of the conical shape is smoothly rounded in shape. The circumferential edge of the conical shape connecting with a top surface of the light transmissive plate 40*a* is also rounded to eliminate the edge which causes scattering light to be a stray light It is preferable that the optical-path modifying element 40 directs the optical-path of the light ray L10 into the image reading area E. This structure can increase the intensity of illumination by the lighting device 13 illuminating a target commodity carried in the proximity to the transparent plate 18.

Setting the abovementioned optical-path modifying element 40 can achieve that the light ray of potential stray light L10 does not reach the image detector 14*a* through the entrance pupil of the optical lens 14*b* provided in the image pick-up section 14.

In the image pick-up device 17 described in the second embodiment, uniform intensity distribution of illumination can be obtained in the image reading area E in the proximity to the transparent plate 18 by suppressing generation of the stray light.

Incidentally, in the second embodiment, the cross-sectional shape is not limited to the concave in the conical shape. Instead of the concave, the optical-path modifying portion 14*b* having a convex in cross-sectional shape, which is formed in an approximate conical shape having a hyperbolic curve, can also be available.

The POS system 1 formed of a combination of the image reading apparatus 11 having the image pick-up device 17 and the POS terminal 12 is described in the aforementioned embodiments. Application of the image reading apparatus 11 is not limited to the POS system. The image reading apparatus 11 can be installed in an integrated POS system, serving as a single POS system, including functions of the image reading apparatus 11 and the POS terminal 12. A self check-out system is exemplified in the integrated POS system set in a retail store, e.g., supermarket, grocery store, and so on, and operated by a customer.

The several embodiments of the present invention are explained above. However, these embodiments are presented as examples and are not intended to limit the scope of the invention. These new embodiments can be carried out in other various forms. Various kinds of omission, replacement, and change can be performed without departing from the spirit of the invention. These embodiments and modifications thereof are included in the scope and the spirit of the invention and include in the inventions described in claims and a scope of equivalents of the inventions.

What is claimed is:

1. An image pick-up device, which photographs an object to generate an image signal representing the object, comprising:
    a housing to which an opening is formed to pass light therethrough;
    a transparent plate which covers the opening and has a first surface facing the object and a second surface opposite to the first surface;
    an image detector arranged in the housing to generate the image signal;
    an optical lens forming an image of the object on the image detector through the transparent plate when the object is positioned in an imaging area from which light reaches the image detector through the optical lens;
    a lighting device for emitting light which is arranged in the housing to illuminate the object and is placed both in an inner area in which the imaging area outside the housing is folded into the housing with reference to the first surface, and in an outer area of the imaging area in the housing; and
    an optical-path modifying element which modifies an optical path of a stray light resulting from the light which is emitted by the lighting device and is reflected by at least one of the first and second surfaces.

2. The image pick-up device according to claim 1, wherein the optical-path modifying element is a light shield to shield the potential stray light.

3. The image pick-up device according to claim 2, wherein the light shield is arranged close to the transparent plate.

4. The image pick-up device according to claim 1, wherein the optical-path modifying element modifies at least one of an angle of the optical path and a position of the optical path.

5. The image pick-up device according to claim 1, wherein an arrangement of the transparent plate and the lighting device satisfies following relation:

$$1 \leq Lc/Lo \leq \sqrt{n}$$

where Lc: an optical path length extending from the lighting device to an approximate center portion of the opening on the transparent plate, Lo: an optical path length extending from the lighting device to an outer portion of the imaging area on the transparent plate, and n: an integer more than one.

6. The image pick-up device according to claim 1, wherein the transparent plate has a flat surface.

7. The image pick-up device according to claim 1, wherein the optical-path modifying element is made of a light transmissive plate having a concave portion in cross-sectional shape.

8. A POS system having an image pick-up device which photographs an object to generate an image signal representing the object, and a POS terminal which executes a sales registration proceeding in accordance with the image signal, the image pick-up device comprising:
    a housing which includes an opening to pass light therethrough;
    a transparent plate which covers the opening and has a first surface facing to the object and a second surface opposite to the first surface;
    an image detector disposed in the housing to generate the image signal;
    an optical lens forming an image of the object onto the image detector through the transparent plate when the object is positioned in an imaging area from which light reaches the image detector through the optical lens;
    a lighting device arranged in the housing to illuminate the object and is placed both in an inner area in which the imaging area outside the housing is folded into the housing with reference to the first surface, and in an outer area of the imaging area in the housing; and
    an optical-path modifying element which modifies an optical path of a stray light resulting from light emitted by the lighting device and reflected by at least one of the first and second surfaces.

9. The POS system according to claim 8, wherein the optical-path modifying element is a light shield to shield the potential stray light.

10. The POS system according to claim 9, wherein the light shield is arranged close to the transparent plate.

11. The POS system according to claim 8, wherein the optical-path modifying element modifies at least one of an angle of the optical path and a position of the optical path.

12. The POS system according to claim 8, wherein an arrangement of the transparent plate and the lighting device satisfies the following relation, $$1 \leq Lc/Lo \leq \sqrt{n}$$

where Lc: an optical path length extending from the lighting device to an approximate center portion of the opening on the transparent plate, Lo: an optical path length extending from the lighting device to an outer portion of the imaging area on the transparent plate, and n: an integer more than one.

13. The POS system according to claim 8, wherein the transparent plate has a flat surface.

14. The POS system according to claim 8, wherein the optical-path modifying element is made of a light transmissive plate having a concave portion in a cross-sectional shape.

* * * * *